United States Patent Office 3,660,572
Patented May 2, 1972

3,660,572
INSECTICIDAL COMPOSITION
Ludwig Friedrich Emmel, Bergen-Enkheim, Germany, and Dieter Kaeding, Binningen, Switzerland, assignors to Farbwerke Hoechst Aktiengesellschaft vormals Meister Lucius & Bruning, Frankfurt am Main, Germany
No Drawing. Filed Oct. 24, 1969, Ser. No. 869,381
Claims priority, application Germany, Nov. 7, 1968,
P 18 07 567.7
Int. Cl. A01n 9/36
U.S. Cl. 424—200
1 Claim

ABSTRACT OF THE DISCLOSURE

Novel pesticidal compositions are described containing 4 - (O,O - dimethylphosphoryl)-5-chloro-bicyclo-[3,2,0]-heptadiene-1,4 in admixture with
(a) 1 - phenyl-3-(O,O-diethyl-thionophosphoryl)-1,2,4-triazole or with
(b) O,O-dimethyl - (1 - hydroxy-2,2,2-trichloroethyl)-phosphonic acid ester, or with
(c) O,O-dimethyl-S - (3,4 - dihydro - 4 - oxo - 1,2,3-benzotriazine - 3 - yl methyl)-dithiophosphoric acid ester, or with
(d) O,O-dimethyl-S - (5 - methoxy-1,3,4-thiadiazole-2-(3H)-one-3-yl-methyl)-dithiophosphoric acid ester.

The compositions are effective in low concentrations against a large number of pests, especially insects, mites and acarids.

---

The present invention relates to pesticidal compositions characterized by a content of 4 - (O,O - dimethylphosphoryl)-5-chloro-bicyclo - [3,2,0]-heptadiene-1,4 of Formula I

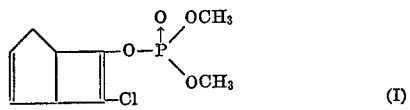

in admixture with
(a) 1 - phenyl - 3 - (O,O-diethyl-thionophosphoryl)-1,3,4-triazole of Formula II

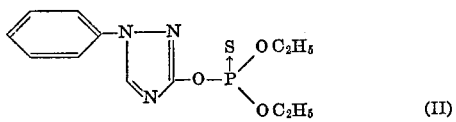

or with
(b) O,O-dimethyl - (1 - hydroxy-2,2,2-trichloroethyl)-phosphonic acid ester of Formula III

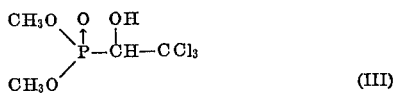

or with
(c) O,O-dimethyl-S-(3,4-dihydro - 4 - oxo-1,2,3-benzotriazine-3-yl-methyl)-dithiophosphoric acid ester of Formula IV

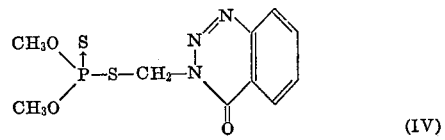

or with
(d) O,O-dimethyl-S-(5-methoxy - 1,3,4 - thiadiazole-2-(3H)-one-3-yl-methyl) - dithiophosphoric acid ester of Formula V

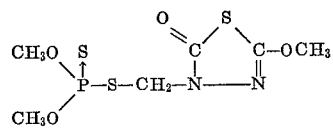

The compound of Formula I is known from Belgian Pat. 706,795. The compound of Formula II has been disclosed in Belgian Pat. 716,070. The compound of Formula III is known from Swiss Pat. 303,656. The compound of Formula IV is described in German Pat. 927,270 and the compound of Formula V is known from the Journal of Economic Entomology, volume 59 (1966), page 1415.

The aforesaid compounds can be used individually as pesticides. It has been found, however, that when they are used in low concentrations their effect is often not sufficient for a quantitative destruction of the pests.

The present invention is based on the observation that mixtures of 4 - (O,O-dimethyl-phosphoryl) - 5 - chloro-bicyclo-[3,2,0] - heptadiene - 1,4 (I) with 1-phenyl-3-(O, O - diethyl-thionophosphoryl) - 1,2,4 - triazole (II), or with O,O-dimethyl - (1 - hydroxy - 2,2,2 - trichloroethyl)-phosphonic acid ester (III), or with O,O-dimethyl-S-(3,4-dihydro - 4 - oxo - 1,2,3 - benzotriazine-3-yl-methyl)-dithiophosphoric acid ester (IV), or with O,O-dimethyl-S-[5 - methoxy - 1,3,4 - thiadiazole - 2 - (3H) - one - 3-yl-methyl]-dithiophosphoric acid ester (V) exhibit an especially favorable effect in those cases in which corresponding concentrations of only one active compound are insufficient.

Mixtures consisting of 1 to 2 parts by weight of the compound of Formula I with 1 to 12 parts by weight of a compound of Formulae II to V give a good effect, mixtures of 1 part by weight of the compound of Formula I with 1 to 8 parts by weight of a compound of Formulae II to V being preferred.

The compositions of active ingredients according to the invention permit much more effective combat, in low concentrations, of a large number of pests than do the individual active ingredients alone. This is especially the case with insects such as plant lice (aphis), common flies (*Musca domestica*), cockroaches (*Periplaneta americana* and *Phyllodromia germanica*), beetles e.g. Mexican bean beetle (*Epilachna varivestris*), bugs e.g. cotton strainer (Dysdercus) and spider mites (Tetranychidae). As compared with only one active component the compositions of active ingredients according to the invention have a considerably improved insecticidal and acaricidal effect. This effect is surprisingly higher than the effect of the individual components and thus it is synergistic.

The compositions of active ingredients according to the invention can be used in admixture with solid or liquid inert carrier materials, adhesives, wetting agents, dispersing agents and grinding auxiliaries, in the form of wettable powders, emulsions, suspensions, dusts, granules, fly papers, spreading agents and washing agents. They can also be mixed with other insecticides, fungicides, nematocides and herbicides.

Suitable carrier materials are mineral substances such as aluminum silicates, argillaceous earths, kaolin, chalks, siliceous chalks, talc, kieselguhr, or hydrated silicic acids, as well as preparations of the said mineral substances with special additives, for example chalk with sodium stearate.

As adhesives there may be used glutinous cellulose products or polyvinyl alcohols. As wetting agents all suitable emulsifiers such as oxyethylated alkyl phenols, salts of aryl or alkylarylsulfonic acids, salts of methyltaurine, salts of phenyl kogasin sulfonic acids or soaps can be used.

Suitable dispersing agents are salts of ligninsulfonic acid salts of naphthalene-sulfonic acid and possibly hydrated silicic acids or kieselguhr.

As grinding auxiliaries there are used suitable inorganic or organic salts such as sodium sulfate, ammonium sulfate, sodium carbonate, sodium bicarbonate, sodium thiosulfate, sodium stearate and sodium acetate.

The pesticidal compositions according to the present invention are advantageously used in the form of an emulsifiable concentrate containing 10% to 60% by weight of the mixture of active ingredients and 5 to 20% by weight of a wetting agent, the balance up to 100% by weight being one or several organic solvents.

For the so-called ultra-low volume method, according to which highly concentrated mixtures are sprayed through nozzles from aeroplanes, pesticidal compositions can be used which consist of 70 to 95% by weight of a mixture of active ingredients according to the invention and 30 to 5% by weight of aliphatic and/or aromatic mineral oils and/or ketones, each having a boiling point above 120° C., or vegetable oils such as cotton seed oil or castor oil, or liquid emulsifiers such as ethoxylated alkyl phenols, for example nonyl phenol with 5 to 15 ethylene oxide units per molecule.

The following examples illustrate the invention, the percentages being by weight unless otherwise stated.

EXAMPLE 1

A xylene solution containing 50% of 4-(O,O-dimethyl-phosphoryl)-5-chloro - bicyclo - [3,2,0] - heptadiene-1,4 (I) and 25% of an emulsifier mixture was emulsified in water together with another xylene solution containing 40% of 1-phenyl-3-(O,O-diethyl-thionphosphoryl)-1,2,4-triazole (II) and 12% of an emulsifier mixture in such a manner that the compositions had the concentrations of active ingredients indicated in the following Table I.

With the emulsions thus obtained horse beans (*Vicia faba*) infested with black bean aphids (*Doralis fabae*) were sprayed until the emulsion dripped from the leaves and the horse beans were placed in a greenhouse at 20° C. in an atmosphere of 45% of relative humidity. 24 hours after spraying the living and dead aphids were counted. The result is indicated in the following Table I.

For comparison horse beans infested with black bean aphids were treated under identical conditions with the aforesaid bicycloheptadiene derivative (I) in the xylene solution which had been emulsified in water to such an extent that the concentrations of active ingredient indicated in Table I were obtained. In Table I the said comparative emulsions are designated as comp. I.

For further comparison horse beans infested with black bean aphids were treated under identical conditions with the aforesaid triazole derivative (II) in the xylene solution which had been emulsified in water to such an extent that the concentrations of active ingredient indicated in Table I were obtained. In Table I the said comparative emulsions are designated as comp. II.

The results listed in Table I, columns 1 to 3 indicate that the compositions of active ingredients according to the invention in the specified concentrations killed the bean aphids completely or substantially, whereas the comparative emulsions I and II had a much weaker effect.

EXAMPLE 2

Mallows (*Malva* spec.) infested with green peach aphids (*Myzodes persicae*) were sprayed with the emulsions specified in Example 1 and the infested plants were placed in the greenhouse. After 24 hours, the living and dead green peach aphids were counted. The results are listed in column 4 of Table I. In this case, too, it can be seen that the composition of active ingredients according to the invention is much more effective against the pests than the individual components.

EXAMPLE 3

The covers and bottoms of Petri dishes were uniformly sprayed with 1 cc. each of a solution of the compositions of active ingredients according to the invention (cf. Example 1) in acetone in the concentrations indicated in Table II. After evaporation of the solvent, common flies (*Musca domestica*) and American cockroaches (*Periplaneta americana*, third stage) were placed in the Petri dishes. The effect was evaluated after 5 to 8 hours, respectively. The results are listed in Table II.

For comparison the individual active ingredients comp. I and comp. II mentioned in Example 1 were tested in analogous manner in acetone solution. Table II shows the superior effect of the composition of active ingredients according to the invention as compared with the effect of the individual components.

EXAMPLE 4

In the manner described in Example 3 the covers and bottoms of Petri dishes were sprayed with acetone solutions of the following compositions of active ingredients according to the invention in the concentrations indicated in Table III:

4-(O,O-dimethylphosphoryl)-5-chloro-bicyclo-[3,2,0]-heptadiene-1,4 (I) with

O,O-dimethyl-(1-hydroxy-2,2,2-trichloroethyl)-phosphonic acid ester (III), or with O,O-dimethyl-S-(3,4-dihydro-4-oxo-1,2,3-benzotriazine-3-yl-methyl)-dithiophosphoric acid ester (IV) or with O,O-dimethyl-S-(5 - methoxy - 1,3,4 - triadiazole-2-(3H)-one-3-yl-methyl)-dithiophosphoric acid ester (V), respectively.

The concentrations in which the pesticidal compositions according to the invention and the individual components, respectively, were applied are indicated in Table III. As test animals there were used common flies (*Musca domestica*) and German cockroaches (*Phyllodromia germanica*, imagos). The pesticidal effect was evaluated 3 and 24 hours, respectively, after the insects had been placed in the Petri dishes.

Table III shows the great superiority of the compositions of active ingredients according to the invention as compared with the individual components.

TABLE I

| Active ingredient | Concentration of active ingredient in percent by weight | Destruction of bean aphids in percent after 24 hrs. | Destruction of peach aphids in percent after 24 hrs. |
| --- | --- | --- | --- |
| Composition of active ingredients according to invention. | 0.0001 (I) plus 0.0004 (II) | 100 | 98 |
|  | 0.0001 (I) plus 0.0003 (II) | 96 | 85 |
|  | 0.0001 (I) plus 0.0002 (II) | 83 | 72 |
|  | 0.0002 (I) plus 0.0002 (II) | 100 | 97 |
| Composition I | 0.0002 (I) | 56 | 30 |
|  | 0.0001 (I) | 0 | 12 |
|  | 0.0004 (II) | 58 | 41 |
| Composition II | 0.0003 (I) | 36 | 28 |
|  | 0.0002 (II) | 20 | 20 |

TABLE II

| Active ingredient | Concentration of active ingredient in percent by weight | Destruction in percent | |
|---|---|---|---|
| | | Common flies after 5 hrs. | Cockroaches after 8 hrs. |
| Composition of active ingredients according to invention | 0.0002 (I) plus 0.0004 (II) | 100 | 100 |
| | 0.0001 (I) plus 0.0004 (II) | 100 | 100 |
| | 0.00005 (I) plus 0.0004 (II) | 100 | 100 |
| Composition I | 0.0002 (I) | 0 | 0 |
| Composition III | 0.0004 (II) | 50 | 0 |

TABLE III

| Active ingredient | Concentration of active ingredient in percent by weight | Destruction in percent | |
|---|---|---|---|
| | | Common flies after 3 hrs. | Cockroaches after 24 hrs. |
| Composition of active ingredients according to invention | 0.0005 (I) plus 0.001 (III) | 100 | 100 |
| | 0.0005 (I) plus 0.0005 (III) | 100 | 100 |
| Composition I | 0.0005 (I) | 0 | 0 |
| Composition III | 0.001 (III) | 50 | 0 |
| | 0.0005 (III) | 0 | 0 |
| Composition according to invention | 0.0005 (I) plus 0.001 (IV) | 100 | 100 |
| | 0.0005 (I) plus 0.0005 (IV) | 100 | 100 |
| Composition I | 0.0005 (I) | 0 | 0 |
| Composition IV | 0.001 (IV) | 30 | 0 |
| | 0.0005 (IV) | 0 | 0 |
| Composition according to invention | 0.0005 (I) plus 0.0005 (V) | 100 | 100 |
| Composition I | 0.0005 (I) | 0 | 0 |
| Composition V | 0.0005 (V) | 30 | 0 |

What we claim is:

1. An insecticidal composition comprising a mixture of one part by weight of 4-(O,O-dimethylphosphoryl)-5-chlorobicyclo-[3,2,0]-heptadiene-1,4 with from 1 to 8 parts of 1-phenyl-3-(O,O-diethylthionophosphoryl)-1,2,4-triazole.

References Cited

Derwent Belgian Patents Report, No. 21, 68, 5, p. 1, 11-20-67.

Derwent Belgian Patents Report, No. 49, 68, 5, p. 3, 6-4-68.

Chemical Abstracts 70, 106068p (1969).

Chemical Abstracts 71, 101861c (1969).

JEROME D. GOLDBERG, Primary Examiner

U.S. Cl. X.R.

424—214